A. Cummings,

Ash Siere.

No. 792. Reissued Aug. 16, 1859.

Witnesses

Horace Andrews

Wm A. Brown

Inventor

Allan Cummings

N. PETERS, PHOTO-LITHOGRAPHER, WASHINGTON, D. C.

UNITED STATES PATENT OFFICE.

ALLAN R. CUMMINGS, OF NEW YORK, N. Y.

IMPROVEMENT IN ASH-SIFTERS.

Specification forming part of Letters Patent No. 23,158, dated March 8, 1859; Reissue No. 792, dated August 16, 1859.

*To all whom it may concern:*

Be it known that I, ALLAN CUMMINGS, of the city, county, and State of New York, have invented certain new and useful Improvements in the Apparatus for Sifting Ashes and other Substances; and I do hereby declare that the following is a full, clear, and exact description thereof, reference being had to the accompanying drawings, making part of this specification, in which—

Figure 1:
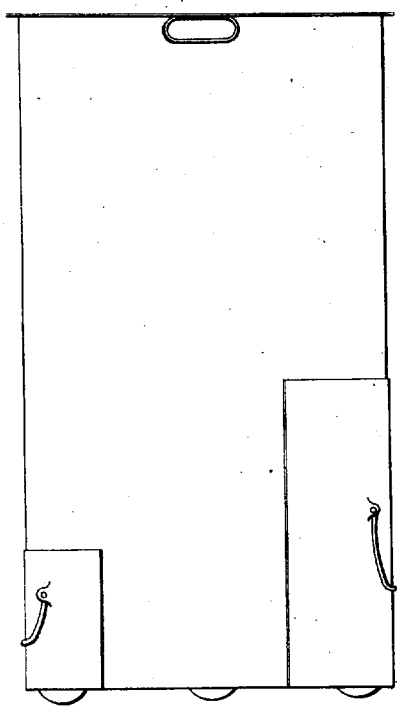
Figure 2:
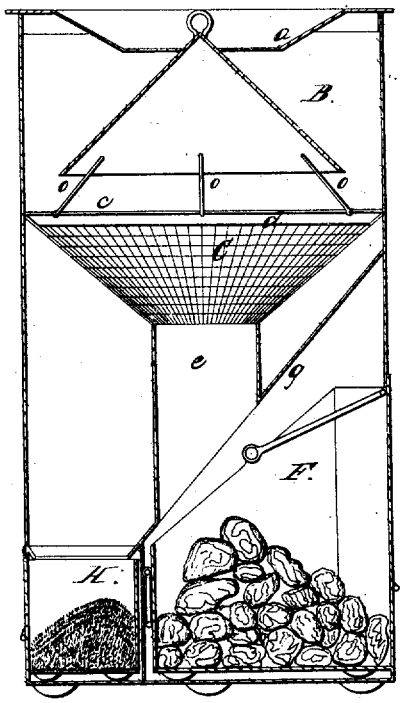
Figure 3:
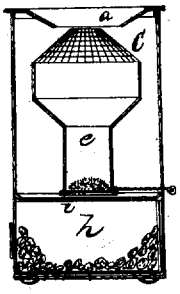

Figure 1 is an elevation of the sifting apparatus; Fig. 2, a vertical section thereof, and Fig. 3 is a vertical section of a modification.

The object of my invention is the production of a simple and cheap apparatus specially for sifting coal-ashes and separating therefrom the lumps of coal, but applicable to the sifting of other substances, and which shall effect the purpose without imparting motion to the apparatus or any part of it, but by simply dumping the substances to be sifted directly into the apparatus, and which shall also prevent the escape of dust during the operation.

In the accompanying drawings Figs. 1 and 2 represent the preferred construction of my improved apparatus for sifting and separating the coarser from the finer particles, whether these be lumps of coal to be separated from ashes or the lumps from the fine particles of other substances. I prefer to make the outer case of a cylindrical form, and within this case, and below the upper edge thereof, I attach a sieve, *c*, in the form of an inverted frustum of a cone, with its outer and upper rim, *d*, extending to and in contact with the surrounding cases, and its lower edge attached to the upper edge of a tube, *e*, which is concentric with the surrounding case, leaving sufficient space between the two for the reception of the ashes or the fine particles to be sifted from the coarser particles of any other substance. The lower and inclined end of the tube *e* is secured to a hole in an inclined diaphragm or partition, *g*, on which the ashes or other siftings fall, and by the inclination of which they are caused to descend into a receptacle, H, either forming a permanent part of the case or separate therefrom, and introduced through a door for that purpose. On the opposite side of the case there is another door for the introduction of a scuttle, F, or any other receptacle for catching the lumps of coal, or coarse lumps of other substances which do not pass through the meshes of the sieve, and which descend through the central tube, *e*. Just over the upper end of the sieve there is a conical distributer or spreader, B, connected with the rim *c* thereof by sustaining-rods *o*; and just above this spreader there is a circular deflector, *a*, in the form of an inverted frustum, attached by a flange to the upper edge of the case. I prefer to place this deflector so that the edge of its central aperture shall surround the upper end of the spreader, leaving an annular space of sufficient capacity for the passage of the cinders or other substances to be sifted, which, however thrown in at top, will be directed by the funnel-like form of the deflector or concentrator *a* against the upper end of the spreader B, and by this latter distributed all around, so as to fall in the upper part of the conical sieve and all around it, and in descending the inclined surface of this sieve the small particles, such as the ashes, will pass through the meshes, and fall onto the inclined diaphragm, and be thereby directed to the receptacle H, while the coarse particles, such as lumps of coal, will roll down the surface of the sieve to the central tube, and thence into the scuttle F below.

From this it will be seen that however carelessly the substances may be thrown into the apparatus they will be properly distributed and discharged onto the conical sieve, and near to the upper part thereof, so as to insure the spreading over the entire surface to effect a proper sifting; and it it will also be seen that any dust rising from the surface of the sieve will be effectually prevented from escaping from the apparatus by the under conical surface of the deflector *a*, which, intercepting it as it rises, will deflect it outward toward the inner circumference of the case, from whence it will finally fall in the receptacle H.

In Fig. 3, which represents a vertical section of a modification of the apparatus, involving only part of my said invention, *a* represents the deflector or concentrator at the top of the case, and *c* the conical screen not inverted, but placed concentric with the deflector, with the smaller end of the cone, if a frustum, or its apex, if a complete cone, placed just under or slightly within the central aperture of the deflector. In this modification the base of the conical sieve is connected with the central tube, *e*, by a short cylinder and conical ring, and the central tube is held in place within the case by radial rods or other suitable means, leaving a chamber or receptacle, *h*, below to receive the lumps, while the lower end of the tube *e* is provided with a trap door bottom, *i*, to hold the ashes or other siftings until the lumps, which have been collected in the chamber *h* below, can be removed, and then the trap-bottom can be opened for the discharge of the ashes. In this modification the substances to be sifted, when thrown in, are deflected and concentrated toward the apex of the cone, as in the first mode of application, and as in this case the sieve performs in part the function of the spreader. In descending on the conical surface they spread out and pass over the entire surface of the sieve, the ashes or other siftings passing through the meshes into the central tube, while the lumps that cannot pass through are discharged at the periphery, and descend between the central tube and outer case to the chamber *h* below; and the dust rising from the sieve is prevented from escaping in the same manner, but not so perfectly as in the first mode of application, but with the additional defect that in subsiding the dust will finally fall and mingle with the lumps in the chamber *h*, and although this modification will make a good sifting apparatus, I prefer the first mode of application; and although I have above described but two modes in which I have contemplated the application of my said invention, I do not wish to be understood as limiting my claim of invention to such modes of application, as other formal changes may be made without materially varying the principle of my said invention.

What I claim as my invention, and desire to secure by Letters Patent, is—

1. The employment of a conical sieve or sieve of an equivalent form, in combination with the two receptacles, one for the siftings and the other for the substance sifted, substantially as and for the purpose described.

2. The conical deflector for deflecting the substances to be sifted and concentrating them, in combination with the spreader, substantially as described, whether the spreader be itself the sieve or employed with a sieve below, as described.

3. In combination with the sieve, the under conical surface of the deflector for preventing the escape of dust from the apparatus, as described.

4. In combination, the deflector, the spreader, the conical sieve, and the receptacles for the siftings and substances sifted, substantially as and for the purpose specified.

ALLAN CUMMINGS.

Witnesses:

HORACE ANDREWS,
WM. H. BISHOP.